US005136198A

United States Patent [19]

Shibuya

[11] Patent Number: 5,136,198

[45] Date of Patent: Aug. 4, 1992

[54] CARBON BRUSH FOR MINIATURE MOTORS AND METHOD OF MAKING SAME

[75] Inventor: Isao Shibuya, Matsudo, Japan

[73] Assignee: Mabuchi Motor Co., Ltd., Chiba, Japan

[21] Appl. No.: 505,906

[22] Filed: Apr. 5, 1990

[30] Foreign Application Priority Data

Apr. 21, 1989 [JP] Japan ................................ 1-103201
Apr. 21, 1989 [JP] Japan ................................ 1-103202

[51] Int. Cl.[5] ..................... H02K 13/00; H01R 39/20; H01R 39/24; H01R 39/26

[52] U.S. Cl. ..................................... 310/251; 310/252

[58] Field of Search ........................ 310/251, 252, 253; 423/460, 461

[56] References Cited

U.S. PATENT DOCUMENTS 3,996,408 12/1976 Fridman et al. .................... 310/253
4,780,112 10/1988 Lloyd et al. ........................ 423/461

FOREIGN PATENT DOCUMENTS 5171909 6/1976 Japan .................................. 310/253

*Primary Examiner*—Steven L. Stephan
*Assistant Examiner*—C. LaBalle
*Attorney, Agent, or Firm*—McGlew & Tuttle

[57] ABSTRACT

A carbon brush used for a miniature motor, which has a permanent magnet field and is caused to rotate through current commutation via a commutator, formed by bonding graphite powder and used for making sliding contact with the commutator for current commutation, in which the carbon brush is a metal-plated graphite brush formed by pressure-forming and sintering the graphite powder after covering particles of the graphite powder with a metallic layer; the graphite powder used for the metal-plated graphite brush being purified to reduce the ash content of the graphite powder to 0.05 wt. %, and the method of making the same.

2 Claims, 7 Drawing Sheets

| No. | RECTIFICATION WAVEFORM | MECHANICAL NOISE |
|---|---|---|
| I | △ (2) | 46 dB |
| II | X (10) | 40 dB |
| III | X (10) | 40 dB |
| IV | O (0) | 38 dB |

| TEST No. | PARTICLE SIZE OF OXIDE POWDER | SERVICE HOURS BEFORE MOTOR FAILURE (HOURS)   | AVERAGE SERVICE HOURS BEFORE MOTOR FAILURE | DEGREE OF WEAR AFTER 80 HOURS OF MOTOR OPERATION |
|---|---|---|---|---|
| 1 | NONE | | OK | 100% |
| 2 | LESS THAN 50μ | | OK | 33% |
| 3 | 50μ ~ 60μ | | 5 MOTORS FAILED AFTER 8 HOURS (ave.) OF SERVICE. | REMAINING FIVE MOTORS: 38 % |
| 4 | 60μ ~ 74μ | | 4.3 h | ALL MOTORS FAILED |
| 5 | 74μ ~ 105μ | | 3.9 h | " |
| 6 | 105μ ~ 149μ | | 4.3 h | " |
| 7 | 149μ ~ 174μ | | 4.5 h | " |

| TEST No. | OXIDE CONTENT wt% | SERVICE HOURS BEFORE MOTOR FAILURE (HOURS) | AVERAGE SERVICE HOURS BEFORE MOTOR FAILURE | DEGREE OF WEAR AFTER 80 HOURS OF MOTOR OPERATION |
|---|---|---|---|---|
| 1 | 0.1 | | OK | 43% |
| 2 | 0.5 | | OK | 38% |
| 3 | 1.0 | | OK | 32% |
| 4 | 3.0 | | OK | 32% |
| 5 | 5.0 | | OK | 33% |
| 6 | 10.0 | | OK | 31% |
| 7 | 12.0 | | 33h | ALL MOTORS FAILED |

CARBON BRUSH FOR MINIATURE MOTORS AND METHOD OF MAKING SAME

BACKGROUND OF THE INVENTION

1. Field of the Invention

This invention relates generally to a carbon brush for miniature motors and the method of making the same, and more particularly to a carbon brush for miniature motors used in a miniature motor having a permanent magnet field, which a metal-plated graphite brush formed by coating particles of graphite powder with a metallic layer, and then pressure-forming and sintering the graphite powder; the ash content of the graphite powder being reduced to less than 0.05 wt. % to reduce mechanical noise and improve commutation properties.

2. Description of the Prior Art

Carbon brushes for miniature motors have heretofore been manufactured by adding a binder to graphite powder purified to approximately to 99% or 99.5%, grinding and screening the solidified mixture, blending metallic powder with the ground and screened mixture to impart desired electrical conductivity as necessary, and then pressure-forming and sintering the resulting mixture.

To eliminate the use of the binder, a so-called copper-plated graphite brush is known. The copper-plated graphite brush is manufactured by copper-plating particles of graphite powder which is purified to approximately 99%, then pressure-forming and sintering the copper-plated graphite powder without adding a binder.

The former process of the above-mentioned conventional methods involves the forming and sintering of graphite powder (containing ashes) together with a binder. The use of the binder produces the residual carbon formed as the result of the sintering and carbonization of the binder, causing the composition strength to increase. The increased composition strength tends to increase mechanical noise generated when the brush thus manufactured makes sliding contact with the surface of the commutator.

The latter process of manufacturing a copper-plated graphite brush, on the other hand, involves application of a copper layer onto the surface of the particles of graphite powder. In this process, the copper-plated graphite powder is pressure-formed and sintered without using a binder. The absence of the binder with the copper-plated graphite brush helps reduce mechanical noise, compared with the carbon brush manufactured using the binder.

The copper-plated graphite brush, however, has insufficient commutation properties because of the presence of the ash content in the graphite powder.

The conventional copper-plated graphite brush has a number of unwanted problems. For example, the ash particles when brought in contact with the commutator surface, tend to produce scratches on the commutator surface, causing sparks to generate during the subsequent commutation. In addition, the presence of the ash particles also cause instantaneous conduction failure.

SUMMARY OF THE INVENTION

It is an object of this invention to provide a carbon brush for miniature motors formed by using metal-plated graphite powder whose graphite particles having an ash content of not more than 0.05 wt. % are covered with a metallic layer to reduce mechanical noise and improve commutation properties.

It is another object of this invention to provide the method of making a carbon brush for miniature motors in which graphite powder having an ash content of not more than 0.05 wt. % is produced by purifying graphite powder using a halogen-liberating substance in a high-temperature inert-gas atmosphere, and a carbon brush is manufactured by pressure-forming and sintering the resulting graphite powder having an ash content of not more than 0.05 wt. % to improve mechanical noise and commutation properties.

It is still another object of this invention to provide a carbon brush for miniature motors formed by adding oxide powder whose particle size is less than 50 microns to metal-plated graphite powder whose ash content is less than 0.05 wt. % and whose graphite particles are covered with a metallic layer to improve mechanical noise and commutation properties.

It is further object of this invention to provide the method of making a carbon brush for miniature motors in which graphite powder having an ash content of not more than 0.05 wt. % is produced by purifying graphite powder using a halogen-liberating substance in a high-temperature inert-gas atmosphere, and a carbon brush is manufactured by adding oxide powder whose particle size is not more than 50 microns to graphite powder having an ash content of not more than 0.05 wt. % and pressure-forming and sintering the resulting mixture.

DETAILED DESCRIPTION OF THE EMBODIMENTS

Figure 1:
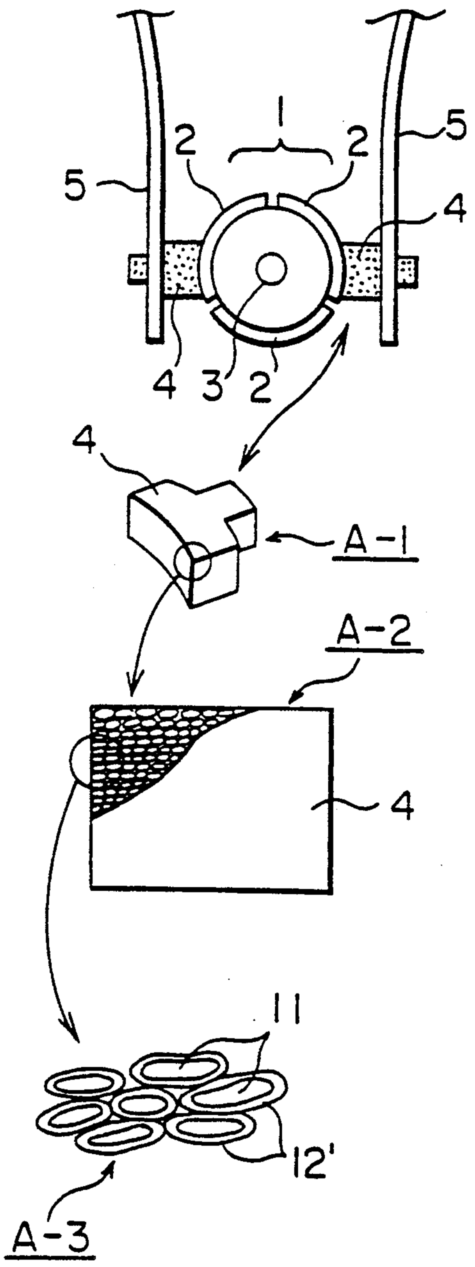
FIG. 1 is a diagram illustrating the principle of this invention.

FIG. 1 is a diagram of assistance in explaining the principle of this invention. FIG. 1 includes showing the state where carbon brushes are used in a miniature motor, a prespective view (A-1), a partially enlarged view (A-2) and a structural diagram (A-3) of the carbon brush.

In FIG. 1 reference numeral 1 refers to a commutator; 2 to a commutator segment; 3 to a rotating shaft; 4 to a carbon brush; 5 to a brush resilient member; 11 to a graphite particle; and 12' to a metallic layer, such as a copper coating layer, respectively.

In FIG. 1, carbon brushes 4 are held by electrically conductive brush resilient members 5 and supported in such a manner as to make sliding contact with commutator segments 2, 2 and 2. The carbon brush 4 is sintered into an inverted T shape with the stem thereof being supported by the brush resilient member 5, as shown in A-1 of FIG. 1, a perspective view. The bottom surface of the inverted T shape is formed into a slightly curved shape to make sliding contact with the commutator segment 2.

As shown in A-2 of FIG. 1, a partially enlarged view, the carbon brush 4 is formed by pressure-forming and sintering graphite powder particles plated with copper, for example. As shown in A-3 of FIG. 1, a structural diagram, a metallic layer 12' is formed on the surface of each of the graphite particles 11, 11, ---. These graphite powder particles are pressure-formed and sintered to be bonded together by the metallic layer 12'.

Figure 2:
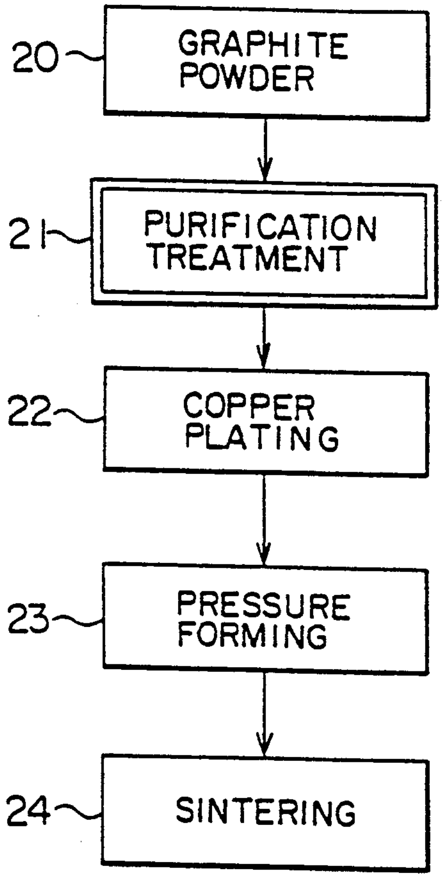
FIG. 2 is a flow diagram illustrating one example of the manufacturing method of this invention.

FIG. 2 is a flow diagram illustrating one example of the manufacturing process of this invention. Numeral 20 in the figure denotes graphite powder which is refined to approximately 99%; 21 a purification treatment process according to this invention; 22 a metal plating process; 23 a pressure-forming process; and 24 a sintering process.

A carbon brush embodying this invention is manufactured, as shown in FIG. 2, by executing the purification treatment process 21, the metal plating process 22, the pressure-forming process 23 and the sintering process 24 on the graphite powder. Although description of the metal plating process 22, the pressure-forming process 23 and the sintering process, all of which are well known, has been omitted, the purification treatment process, which is a main feature of this invention, will be described in detail, referring to FIG. 3.

Figures 3, 4:
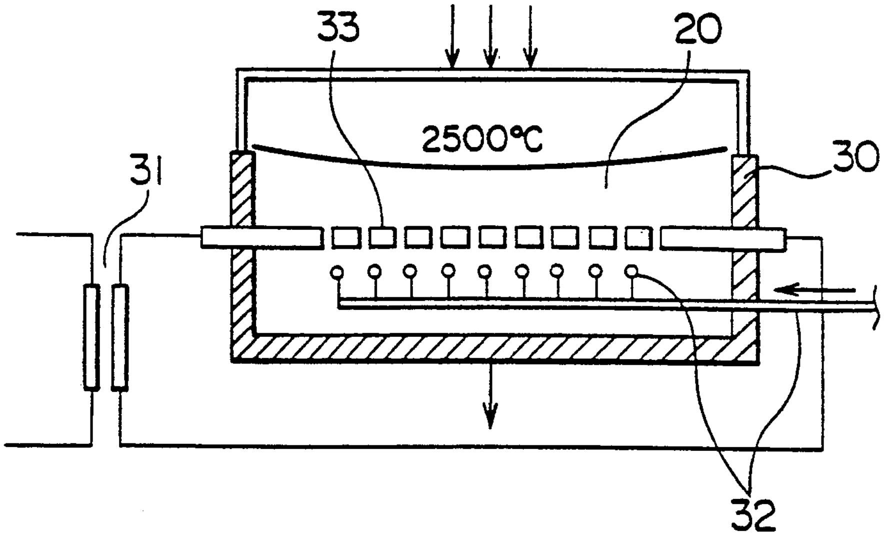
FIG. 3 is a conceptual diagram illustrating a refining furnace used in a purification treatment process according to this invention.

FIG. 3 is a conceptual diagram of a refining furnace used in the purification treatment process according to this invention. Numeral 20 in the figure refers to graphite powder; 30 to a furnace proper; 31 to a power supply transformer; 32 to a halogen pipe; and 33 to a heater, respectively.

The purification treatment process corresponds to a process where impurities in graphite powder using a halogen-liberating substance, such as $CCl_4$ or $CCl_2F_2$, which readily liberates halogen at high temperatures in an inert gas, such as nitrogen or argon. That is, graphite powder 20 is charged into the furnace proper 30 in which a halogen gas pipe 32 is placed in the graphite powder. As temperature in the furnace is raised by the heater 33 to approximately 1,800° C., $CCl_4$ is saturated in the inert gas and fed through the halogen pipe 32. In this case, it is assumed that the following reactions take place in the furnace.

$$CCl_4 \rightarrow C + 2Cl_2$$

$$3C + Fe_2O_3 + 3Cl_2 \rightarrow 2FeCl_3 + 3CO$$

When the temperature rises to over 1,900° C., $CCl_4$ is replaced with $Cl_2F_2$, and purification treatment is continued for over 4 hours at over 2,500° C. In the subsequent cooling process, too, flushing with an inert gas, such as nitrogen or argon, is maintained to prevent impurities from reversed diffusion and remove halogen.

This purification treatment process yields graphite having a purity of over 99.95 wt. %, with impurities less than 0.05 wt. %.

The copper-plated graphite brush manufactured by copper-plating graphite particles in this invention is publicly known, as described in the part describing the prior art. This invention is characterized in that the ash content of the graphite powder, which has been subjected to the purification treatment process 21 but not yet to the metal-plating process 22, is maintained at not more than 0.05 wt. %, that is, that the particles corresponding to the ash content in the whole particles metal-plated, pressure-formed and sintered of the manufactured carbon brush 4.

Consequently, this invention involving the formation of metal-plated graphite brushes makes it possible to reduce mechanical noise during motor operation, compared with conventional carbon brushes using binders. Furthermore, this invention provides carbon brushes having excellent commutating properties due to reduced ash content. In other words, the copper-plated graphite brushes of the prior art, which is publicly known as a concept but has not been realized in practice, has reached to a stage of practical usefulness with this invention.

The present inventor manufactured copper-plated graphite brushes by using the following methods, in addition to the purification treatment process, to improve the purity of the graphite used in metal-plated graphite brushes, and conducted tests on motors incorporating these brushes.

(i) Physical refining

Graphite was separated from impurities with the flotation, process utilizing differences in surface physiochemical properties of solid particles. The physical refining process handled particles of approximately 300 microns in size. Taking advantage of the fact that graphite can be separated with air bubbles, graphite powder was charged into a mixture of oil and air bubbles, and collected by causing graphite particles to adhere to the floating air bubbles. In this process, purities of not less than 98% and less than 99.5% can be obtained. This means that impurities ranging from not less than 0.5% to approximately 2.0% are contained in the graphite powder.

(ii) Chemical treatment

The impurities contained in graphite were dissolved in highconcentration acid and alkali solutions, and the solutions were heated (to 160° C.-170° C.) and pressurized (to 5-6 atms). This treatment is commonly called the autoclave process, which mainly consists of the following reactions:

$$Fe_2O_3 + 6HCl \rightarrow 2FeCl_3 + 3H_2O$$

$$2SiO_2 + 4NaOH \rightarrow 2Na_2SiO_3 + 2H_2O$$

With this chemical treatment, purities of not less than 99% and less than 99.9% can be obtained, with impurities of not less than 0.05% and approximately 1.0% remaining in the graphite powder.

FIG. 4 shows the test results of the carbon brushes (hereinafter referred to as first carbon brushes) manufactured with the embodiment shown in FIG. 2. No. I represents the test results in which conventional carbon brushes (containing a binder) were used, No. II those in which physically refined copper-plated graphite brushes were used, No. III those in which chemically treated copper-plated graphite, and No. IV those in which copper-plated graphite brushes manufactured using the purification treatment process of this invention, respectively. Ten brushes each for the above-mentioned Nos. I through IV were manufactured and subjected to tests.

The No. I brushes showed an average mechanical noise value of 46 dB, and two of the ten No. I brushes had improper commutation properties in terms of commutation waveforms. The Nos. II and III brushes showed an average mechanical noise value of 40 dB, and all of the Nos. II and III brushes had improper commutation waveforms. The No. IV brushes, on the other hand, had an average mechanical noise value of 38 dB, and all of the ten No. IV brushes had good commutation waveforms.

FIGS. 5A, 5B, 5C and 5D are oscillograph waveform diagrams representing typical commutation waveform when the Nos. I through IV brushes shown in FIG. 4 were used. The term commutation waveform used here means the waveform of motor current shown during the period in which the brushes slides over the commutator segments. With the brushes of this invention shown in FIG. 5D, the commutation waveform appeared virtually regularly, showing good commutation properties.

Figure 5A:
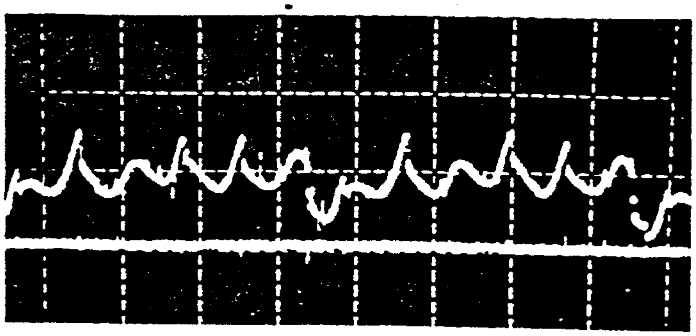
FIGS. 5A, 5B, 5C and 5D are oscillograph waveform diagrams illustrating typical commutation waveform when Nos. I–IV carbon brushes shown in FIG. 4 are used.
Figure 5B:
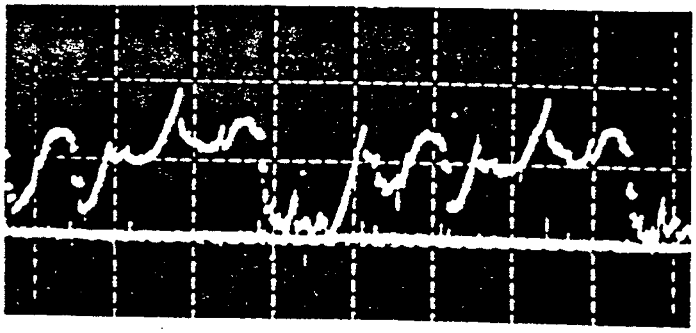
Figure 5C:
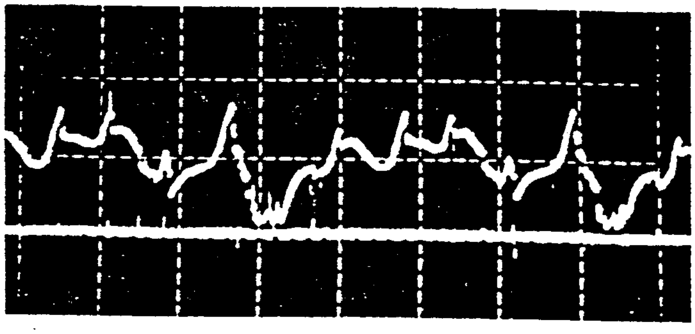
Figure 5D:
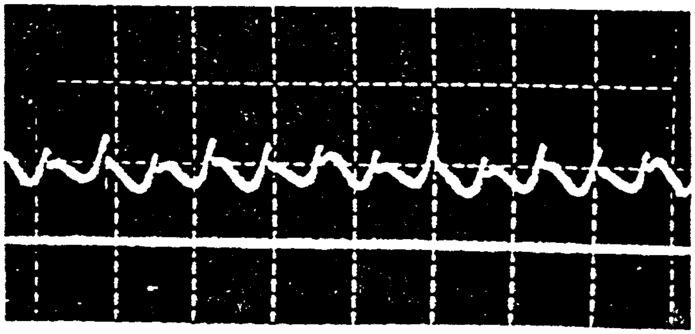

The waveforms for the Nos. II and III brushes shown in FIGS. 5B and 5C showed irregular behaviors, and sometime involved even non-conduction, whereas the waveform for the No. I brushes showed an almost regular behavior, which is in the practical range.

As described above, this invention makes it possible to put into practical usefulness the metal-plated graphite brush that has heretofore been considered impracticable.

Figure 6:
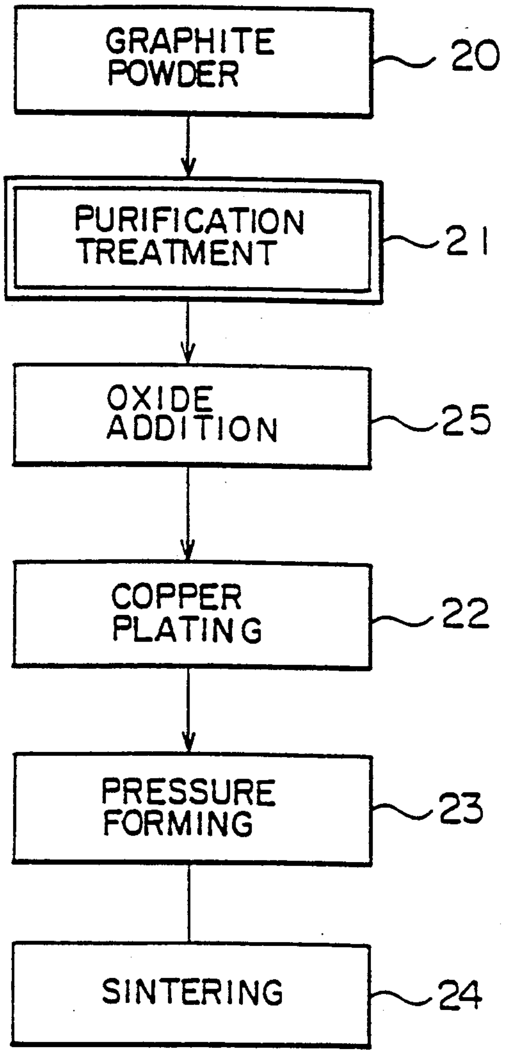
FIG. 6 is a flow diagram illustrating another example of the manufacturing method of this invention.

Furthermore, another embodiment of the carbon brush of this invention and the method of making the same will be described in the following. The carbon brush of this embodiment and the manufacturing method of the same are essentially the same as the first carbon brush described with reference to FIGS. 1 through 5 and the method of making the same. That is, the carbon brush of another embodiment (hereinafter referred to as the second carbon brush) is manufactured with the manufacturing method shown in FIG. 6, in which an oxide addition process to add oxide powder of not more than 50 microns in particle size is added between the purification treatment process 21 and the metal-plating process 22 in the above-mentioned manufacturing method shown in FIG. 2.

Figure 7:
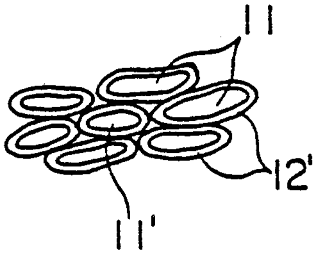
FIG. 7 is a diagram illustrating the composition of another embodiment of the carbon brush of this invention.

As shown in FIG. 7, a structural diagram corresponding to A-3 of FIG. 1, the second carbon brush has metal-plating layer 12′ formed on the surface of the graphite particle 11 and the oxide particle 11′, and both the particles are pressure-formed and bonded to each other with the metal-plating layers 12′.

The same carbon tests as conducted on the carbon brushes described with reference to FIG. 3 were also conducted on the second carbon brushes. The test results showed that the second brushes had an average mechanical noise value of 38 dB, and all the ten brushes showed good commutation waveforms, as in the case of the No. IV brushes shown in FIG. 3.

Figure 8:
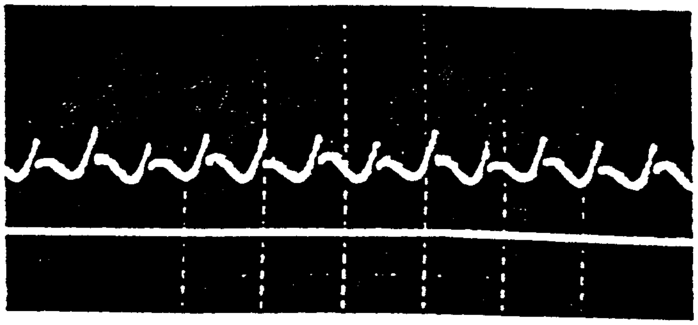
FIG. 8 is an oscillograph waveform diagram illustrating a typical commutation waveform when the carbon brush shown in FIG. 7 is used.
Figure 10:
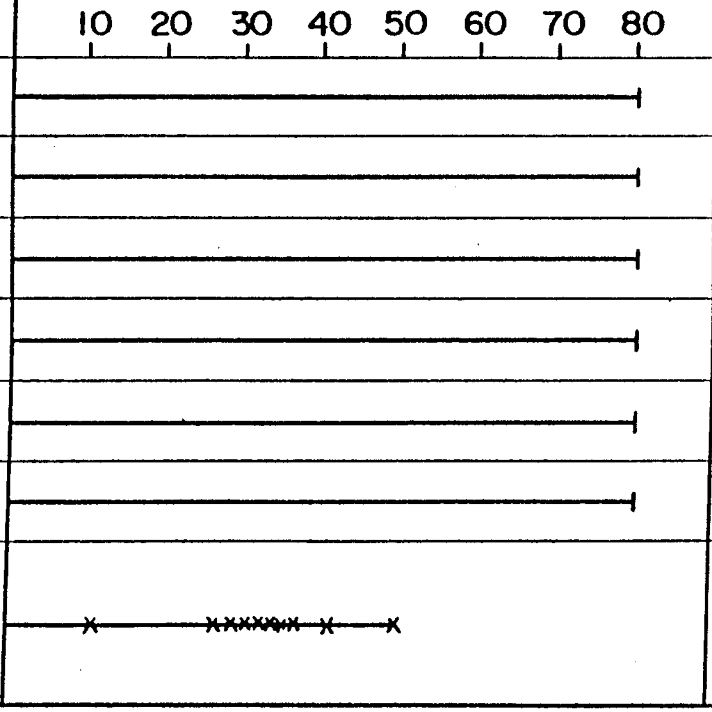
FIG. 10 is a diagram illustrating the test results showing the relationship between the content of oxide powder being added and the degree of wear.

FIG. 8 is an oscillograph waveform diagram representing a typical commutation waveform of the second carbon brushes. As is evident from FIG. 10, the second brushes have a virtually regular commutation waveform, showing good commutation properties.

Figure 11:
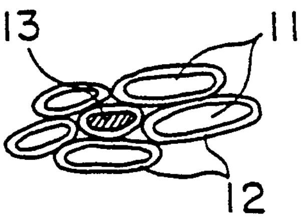
FIG. 11 shows the state of graphite powder particles are bonded together in a conventional copper-plated graphite brush.

The test results shown in FIGS. 12 and 11 revealed that the second carbon brush of this invention, which is manufactured by adding copper-plated oxide powder to high-purity copper-plated graphite powder, and then pressure-forming and sintering the mixture, has a high wearability.

Silicates having compositions, such as $SiO_2$, $Al_2O_3$, $Fe_2O_3$ and MnO, MgO and $TiO_2$, for example, are used as oxides to be added to the above-mentioned second carbon brush. It was also revealed that the above-mentioned wearability has close relations with the particles size and content of oxide powder in the graphite powder.

Figure 9:
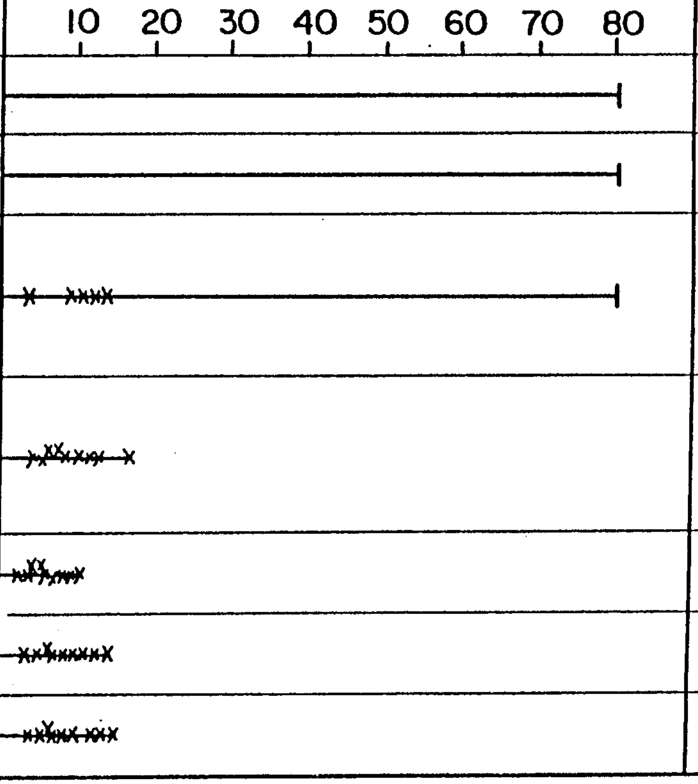
FIG. 9 is a diagram illustrating the test results showing the relationship between the particle size of oxide powder being added and the degree of wear.

FIG. 9 shows the results of tests conducted on graphite brushes to which 3 wt. % of oxide powder was added to elucidate the relationship between the particle size of the oxide powder and wearability. FIG. 11 shows the results of tests conducted on graphite brushes in which oxide powder of under 50 microns in particle size was used to elucidate the relationship between the oxide powder content and wearability. The test results shown in FIGS. 9 and 11 represent max. 80-hour long operation tests on ten brushes manufactured for each test number. The x mark represents the timing at which a brush failed.

As is evident from FIG. 9, the particle size of the oxide powder must be kept under 50 microns (Test No. 2) to reduce wearability. That is, with no oxides added (Test No. 1), wearability becomes higher. With oxides of particle sizes of 50–60 microns (Test No. 3), as many as five brushes failed in a relatively short period of time (8 hours on an average). With other particle sizes (Test Nos. 4 through 7), all brushes failed in a short period of time (3.9–4.5 hours on an average).

Although there is no practical problem with the oxide powder content covering a range of 0.1–10.0 wt. % (Test No. 1 to Test No. 6) because the degree of wear remains at 31% to 43% in that range, as is evident from FIG. 13, more favorable results can be obtained when the oxide powder content is kept within a range of 0.5–10.0 wt. % (Test No. 3 to Test No. 6) because the degree of wear is further reduced to 31 to 33%. With the oxide powder content being as high as 12.0 wt. % (Test No. 7), however, all brushes fail.

Based on the test results described in the foregoing, the carbon brush of this invention is manufactured by adding 0.1 to 10.0 wt. % of oxide powder having a particle size of not more than 50 microns to improve wearability.

Although description has been made with reference to the manufacture of the second carbon brush that copper-plated oxide powder is added to high-purity copper-plated graphite powder before pressure forming and sintering, this invention is not limited to this arrangement, but unplated oxide powder may be added to high-purity copper-plated graphite powder.

As described above, this invention makes it possible to put into practical usefulness the metal-plated graphite brush that has heretofore been considered impracticable, thus improving mechanical noise and commutation properties and realizing carbon brushes having improved wearability.

What is claimed is:

1. A carbon brush for a miniature motor including a permanent magnet field and a commutator for causing a rotor to rotate through current commutation, formed by the steps of;

providing graphite powder purified to reduce ash content to not more than 0.05 wt. % including providing initially purified graphite powder with impurities ranging from not less than 0.05% to 2.0% and subsequently purifying the initially purified graphite powder by employing halogen-liberating substances in a high-temperature inert gas atmosphere;

plating the graphite powder with a metallic layer to form metal plated powder;

pressure forming said metal plated powder to form a pressure-formed piece; and sintering said pressure-formed piece.

2. The carbon brush according to claim 1, wherein said initially purified graphite powder is obtained from one of physical refining and chemical treatment.

* * * * *